United States Patent [19]

Melsek

[11] 3,762,580

[45] Oct. 2, 1973

[54] DUNNAGE TIE-DOWN ARRANGEMENT FOR FREIGHT LOADS

[75] Inventor: Norbert J. Melsek, Chicago, Ill.

[73] Assignee: Signode Corporation, Chicago, Ill.

[22] Filed: Nov. 9, 1971

[21] Appl. No.: 196,951

[52] U.S. Cl. .............................. 214/10.5 D, 214/152
[51] Int. Cl. .............................................. B65g 1/20
[58] Field of Search ................. 214/10.5 R, 10.5 D; 105/367, 369 A, 369 BA

[56] References Cited
UNITED STATES PATENTS

| | | | |
|---|---|---|---|
| 3,145,853 | 8/1964 | Langenberg | 214/10.5 D |
| 2,400,197 | 5/1946 | Grodin | 214/10.5 R X |
| 1,693,395 | 11/1928 | Lawton | 214/10.5 R |
| 3,407,753 | 10/1968 | Stafford, Jr. | 105/369 A X |
| 3,554,135 | 1/1971 | Duvall et al. | 214/10.5 D X |

FOREIGN PATENTS OR APPLICATIONS 1,235,806 3/1967 Germany ...................... 214/10.5 D Primary Examiner—Gerald M. Forlenza
Assistant Examiner—Frank E. Werner
Attorney—Edward R. Lowndes

[57] ABSTRACT

A dunnage tie-down arrangement for preventing upward movement of an inflatable dunnage bag which is interposed between the divided sections of a freight load within a shipping space. One or more tensioned metallic straps have their proximate ends anchored to the load section on one side of the division and their free ends disposed in overlapping sealed relationship with respect to the free ends of corresponding straps which are similarly anchored to the load section on the other side of the division. The thus joined straps bridge the load division above the dunnage bag for hold-down purposes. A method of installing such a dunnage tie-down arrangement which involves a particular sequential placement of the unit items of the load in the shipping space in order to facilitate application of the straps to the load sections and to one another.

8 Claims, 9 Drawing Figures

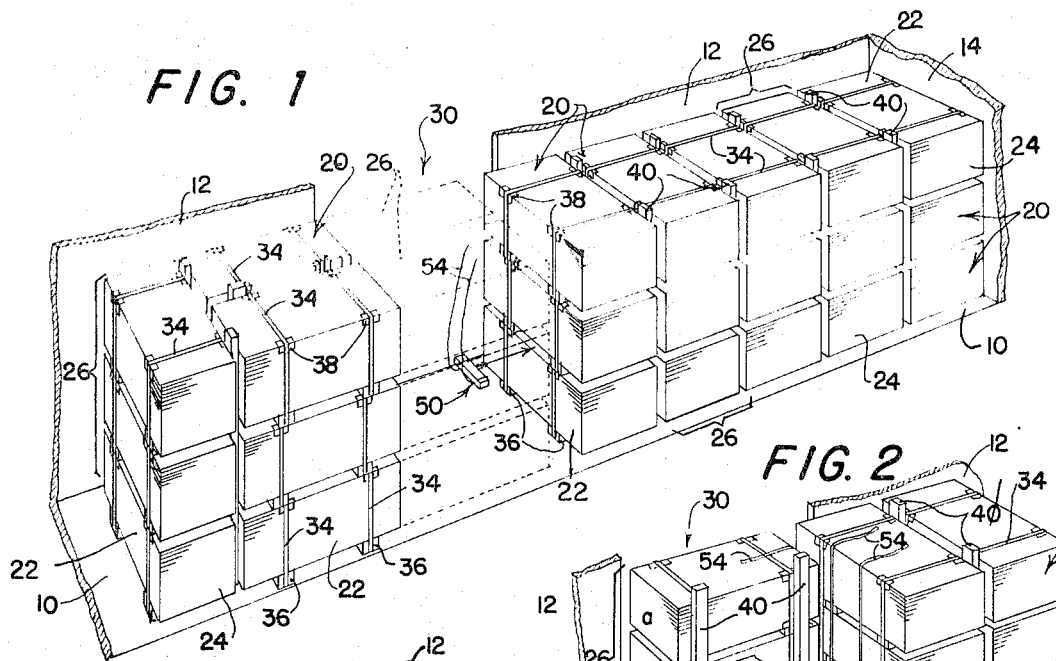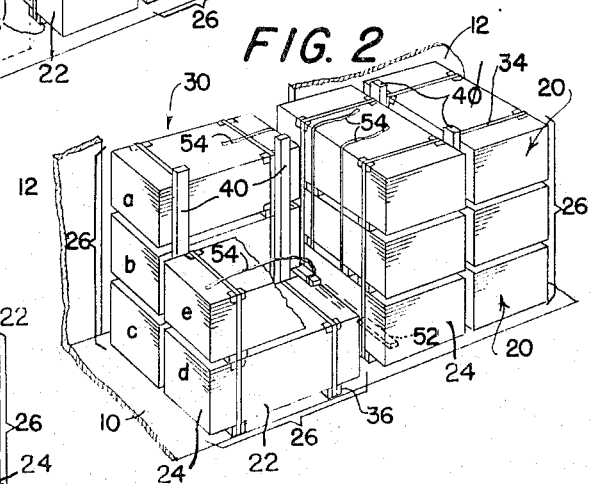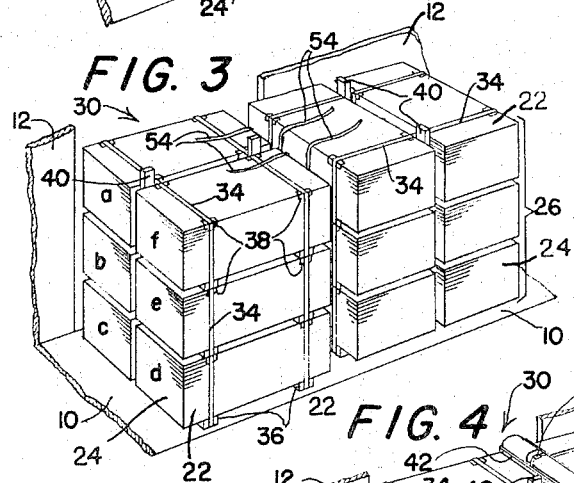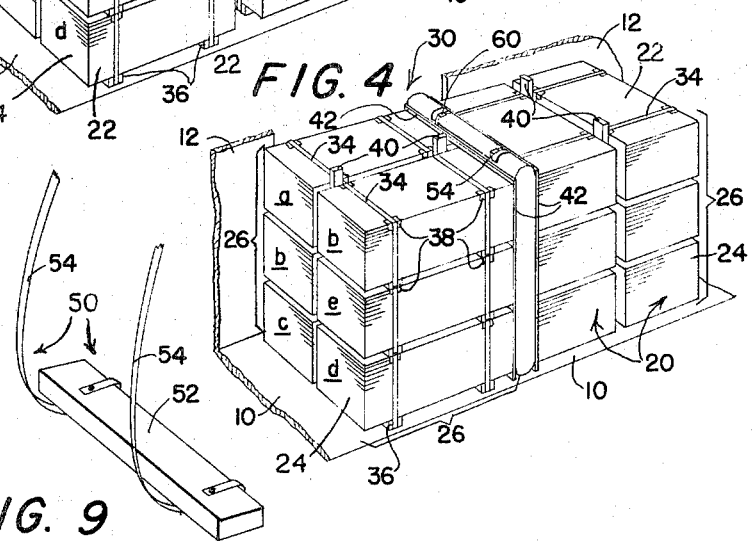

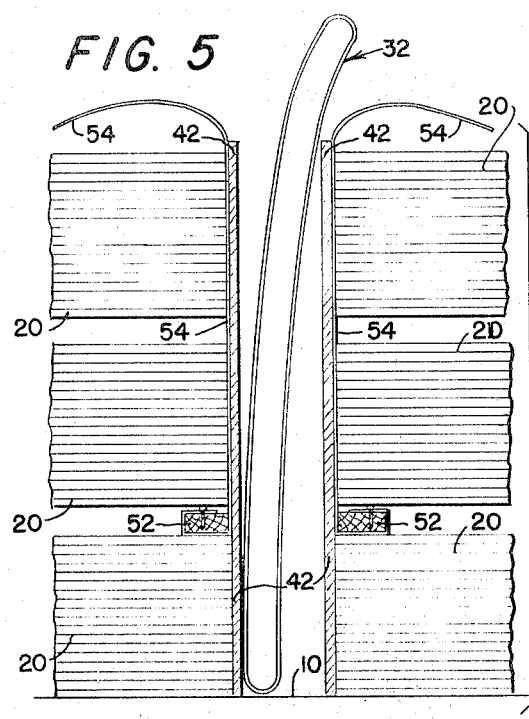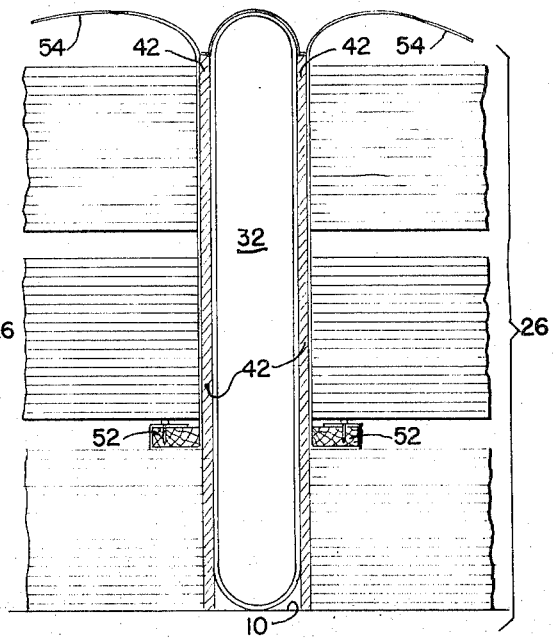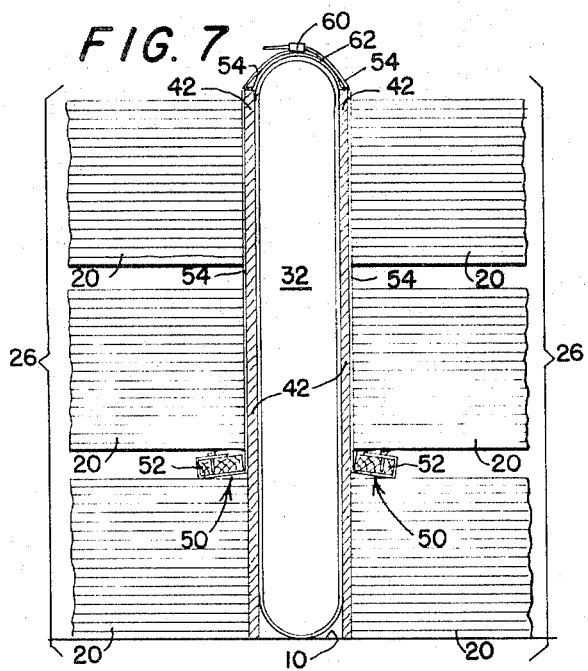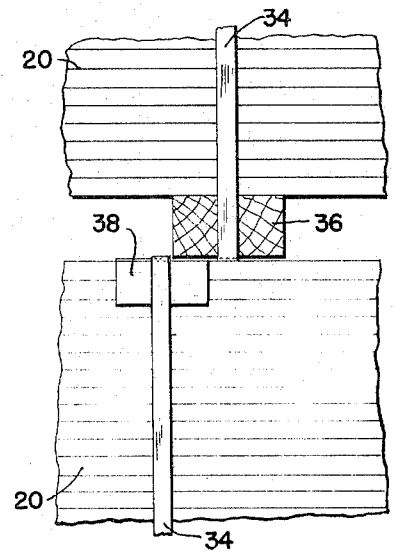

DUNNAGE TIE-DOWN ARRANGEMENT FOR FREIGHT LOADS

The present invention relates to a tie-down arrangement for inflatable dunnage of the type which is used in the shipment of freight or cargo by rail, truck, ship, aircraft and the like, as well as to a method by means of which such tie-down arrangement may be applied to the freight. The invention is particularly concerned with such an arrangement and method by means of which inflatable dunnage bags may be held against displacement within a given load of freight during transportation thereof and incident to shock arising from impact.

When transporting freight by rail or truck it is common practice to cushion the freight against longitudinal impact by separating the total freight load longitudinally into two masses and inserting an inflatable dunnage bag between the separated masses to shore the same so that upon inflation of the bag, the two masses are pushed apart and against the opposite end walls of the freight compartment. Invariably, such separation of the freight is effected in the vicinity of the freight car doors so that access to the separation for bag-insertion may readily be had.

While the above-outlined method of shoring a freight load against impact has proven satisfactory for short haul transportation where only moderate impact shocks are encountered it has proven to be entirely unsatisfactory for use in long haul transportation, or even in short haul transportation involving heavy impact shocks. For reasons that are not entirely clear and which therefore are debatable, it has been found that when a severe impact shock is encountered, as for example in the yarding of freight where a heavy impact results from connecting or disconnecting an engine, or a freight car, the resultant shock to the freight will cause a given dunnage bag to literally leap upwardly from the separation between freight masses and completely leave the separation, such a displacement being the result of a single impact. During long haul transportation where a series of successive light impacts take place as a result of sudden starting or stopping of a freight car, or an uneven application of the brakes, there is a tendency for a dunnage bag to creep gradually upwardly until it assumes an elevated position where it is no longer effective to cushion or shore the load.

It is believed that the cause for such upward movement of a dunnage bag resides in the creation of air pressure below the bag at the precise moment when the load masses which are separated thereby move apart to such an extent that there is insufficient frictional force between the opposite sides of the bag and the load to maintain the bag in position. At the moment of impact, the trailing half of the load is forced against the inflated bag due to its momentum and thus compresses the bag. Ordinarily a dunnage bag is inflated to a pressure of 6 psi but it has been found that for a 12 mph impact, the pressure within such a bag may jump to as much as 15 psi, representing a total force of 30,000 pounds against the divided load. Then, after the impact, the bag expands and pushes the trailing half of the load rearwardly and displaces the same from the leading half of the load momentarily to such an extent that bag friction on both sides is reduced. Thereafter as the trailing half of the load tends to be restored to its original position, the air which has rushed into the space beneath the bag is now compressed and has sufficient power to force the bag upwardly, much in the manner in which a cork will pop out of a bottle which has become overpressurized. These theoretical considerations are based on the observation of slow-motion moving pictures, taken through the open freight car doorway, of a dunnage reinforced load at the moment of impact.

The present invention is designed to overcome the abovenoted limitation that is attendant upon the use of dunnage bags according to the method of load division and shoring which has briefly been outlined above and, toward this end, the invention contemplates the provision of a novel and effective method of restraining a dunnage bag against upward shifting, either gradually when successive impacts are encountered or completely to the point of bag-ejection when a single severe impact shock takes place.

Briefly, according to the present tie-down arrangement and method, it is contemplated that in shoring a given freight load, especially stacked loads where a rectilinear vertical stacking of load units is resorted to, a separation of the total load be effected in the usual manner and in the vicinity of the freight car doorway. During progressive loading of the freight car the load units are brought into the car (usually by means of a fork or other lift truck) and stacked from the opposite ends of the car contiguously and against the end walls until only the doorway space of the car remains to be loaded. Loading of such doorway space between the previously positioned end loads may be accomplished in various ways, depending upon the character of the load but, in any event, the doorway load is handled in such a manner that it is possible to insert reaction anchor devices between certain superimposed load units of previously positioned stacks within the freight car and of the doorway stack about to be positioned in the car, after which lengths of steel or other strapping material which are affixed to the anchor devices are draped in an out-of-the-way position over the top of the finally assembled doorway load and the previously positioned load. Thereafter, one or more dunnage bags are slid sidewise into the void between the doorway load and the adjacent prepositioned load and inflated to shore the divided load in the usual manner of dunnage shoring. Finally the draped strapping material which extends upwardly on opposite sides of the dunnage bag is brought into overlapping relationship above the dunnage bag or bags, and tensioned and sealed by means of a conventional strapping tool.

The provision of a dunnage tie-down arrangement such as has briefly been outlined above constitutes the principal object of the present invention. Other objects and advantages, not at this time enumerated, will readily suggest themselves as the following description ensues.

In the accompanying two sheets of drawings forming a part of this specification, one illustrative embodiment of the method, and of the apparatus by means of which such method is carried out, has been shown.

IN THESE DRAWINGS

FIG. 1 is a fragmentary perspective view of the cargo-carrying portion of a transportation vehicle, such as a railway freight car, as it appears during an initial loading stage embodying the method and apparatus of the present invention;

FIGS. 2 and 3 are fragmentary perspective views, similar to FIG. 1, illustrating successive steps which may be carried out in progressively installing the load in the freight car in divided relationship preparatory to insertion of the dunnage into the divided load;

FIG. 4 is a fragmentary perspective view, similar to FIGS. 2 and 3, showing the collapsed dunnage positioned in the divided load and with the latter completely loaded into the freight car;

FIG. 5 is an enlarged fragmentary side elevational view of the load in the vicinity of the load separation and showing the dunnage inserted into the division preparatory to expansion of the dunnage;

FIG. 6 is a side elevational view, similar to FIG. 5, showing the dunnage in its expanded condition;

FIG. 7 is a side elevational view similar to FIGS. 5 and 6, showing the dunnage in its operative, tied down and completely installed condition;

FIG. 8 is an enlarged fragmentary side elevational view of a unit stack of load components, the view being taken in the vicinity of the horizontal juncture region between two individually and separately strapped components; and FIG. 9 is an enlarged fragmentary detail view of one of a series of four reaction anchor components employed in connection with the invention.

Referring now to the drawings and in particular to FIG. 1, the invention has been illustrated in connection with the loading of the cargo compartment of a freight transporting vehicle such as a railway car, the compartment being defined by the car platform, roof and four walls of the vehicle. In the interests of clarity, only the platform 10, one side wall 12 and one end wall 14 of the freight car have been shown, it being understood that another side and end wall, and a car roof complete the cargo compartment.

The particular load which has been selected herein for exemplary purposes is a load of plywood sheets which are uniformly cut and arranged individually strapped bundles, each bundle constituting a unit load 20. In the exemplary form of load, each unit or bundle is of rectilinear design and is provided with elongated side faces 22 and approximately square end faces 24. In accordance with the present invention, as well as in the conventioanl loading of such bundles into a freight car, the individual bundles are arranged on the car platform 10 in stacked relationship to provide a series of unit stacks which, in FIG. 1, are designated by brackets 26. The unit stacks selected for illustration herein are comprised of three unit loads or bundles 20 in superimposed relationship.

The freight car is provided with the usual pair of transversely opposed doorways 30, only one such doorway being shown herein and in the conventional loading of the cargo compartment it is customary to utilize a suitable lift truck to bring the various unit loads into the compartment through either doorway and arrange the unit stacks so that their long dimension extends transversely of the car platform 10. The car is loaded progressively from the opposite ends of the cargo compartment toward the medially disposed doorways 30 and the last unit stack or the last several stacks to be placed in the compartment constitutes the doorway fill. Depending upon the platform dimensions and the individual stack dimensions, this last doorway fill may be positioned in the compartment with its long dimension extending in either the longitudinal or transverse direction, the particular direction selected being the one which will afford the most appropriate width gap between such doorway fill and one of the next adjacent unit stacks for reception therein of one or more conventional inflatable dunnage bags. Still considering conventional freight car loading, after one or more dunnage bags have been slipped sidewise into the gap, the bag or bags are inflated and the net result of such inflation is to expand the dunnage so that the thus compressed and divided cargo masses are forced hard against the end walls of the car with adjacent unit stacks being forced hard against each other so that the entire mass of cargo is rigidified and protected against impact shocks in a manner well known in the art of cargo loading. A doorway fill consisting of two unit stacks 26 having their long dimensions extending longitudinally of the cargo compartment and with the entire cargo mass being thus rigidified by the use of a single dunnage bag 32 is disclosed in FIG. 4. The disposition of the unit loads 26 and the dunnage bag 32 in this view is conventional but an additional disclosure of a tiedown arrangement which constitutes the essence of the present invention has been incorporated.

It has previously been set forth how, when a shock load is encountered by the freight car, the inflated dunnage bag 32 (in the absence of the present tie-down arrangement) is caused to shift bodily upwardly in the gap between adjacent unit loads and how, when the impact is a severe one, the dunnage bag will leap completely out of the gap so that, thereafter, the load is loose and unprotected against subsequent impact shocks. This tendency for dunnage bag displacement is obviated by the method and apparatus of the present invention in a manner that will be fully described presently.

The foregoing description sets forth in a general way one particular manner in which a freight car may be loaded, such method being capable with but slight modification of accomodating the principles of the present invention. Before describing the present method it is deemed pertinent to describe certain conventional packaging details which are disclosed herein and which facilitate handling of the various unit loads 20 and the unit stacks 26 during loading operations, especially when the method of the present invention is resorted to. Accordingly, as shown in FIGS. 1 and 8, and as is common practice, the plywood sheets of each load unit are held together by tensioned loops 34 of strapping which pass beneath and extend longitudinally along bottom runner boards 36 of the 2 inches × 4 inches variety and by means of which each unit is, in effect palletized for cooperation with the fork tines of a lift truck. Additionally, at the upper side edges of the units, metal or other corner protector strips 38 underlie the strapping loops. In order to assist in aligning the various unit loads 20 vertically in their respective unit stacks 26, vertical wooden spacer strips 40 are interposed between adjacent unit stacks. For dunnage bag protection purposes, plywood sheets 42 (FIGS. 5, 6 and 7) straddle the dunnage bag 32 and shield the latter from contact with the adjacent irregular opposed end and side faces respectively of the unit stacks 26 which constitute the doorway fill and the next adjacent unit stack.

According to the present invention, and in order to prevent the dunnage bag 32 from shifting upwardly under the influence of impact shock as previously described, a plurality of reaction anchor devices 50 such as are illustrated in detail in FIG. 9 are provided, four such devices being adequate for the exemplary cargo installation of FIG. 4. Each anchor device 50 includes an anchor member proper 52 in the form of a length of a length of lumber preferably of the 1 inch × 4 inch variety, to the ends of which there are nailed or otherwise attached lengths 54 of strapping material which may be either steel or non-metallic strapping. These anchor devices are provided for dunnage bag hold-down purposes and, as shown in FIG. 2, they are adapted to be inserted in a horizontal position into the spaces which exist between adjacent vertically separated unit loads 20 and the straps brought upwardly alongside the opposed side faces of opposed unit stacks 26 with the free end portions of the straps 54 sealed in overlapping relationship over the upper edges of the dunnage bag or bags 32 which are disposed within the space or gap which exists between the two sections of the divided load, all in a manner that will be described in detail in connection with the loading of a given freight car.

The manner in which a freight car having medially disposed doorways 30 such as are shown in FIGS. 1 to 4 inclusive is loaded according to the present invention follows the general procedure previously outlined in connection with the conventional loading and dunnage protection of such freight cars. It will be observed that after both ends of the platform 10 on opposite sides of the doorways 30 have received thereon their respective quotas of the load, with the doorway fill remaining to be loaded, there is ample access room for the operator to enter the cargo compartment and insert one of the anchor devices 50 into the space which exists between two superimposed unit loads 20 at one side of the doorway space. The insertion is made by pushing the board 52 sidewise into such space and causing the straps 54 which are attached to the board 52 to extend upwardly alongside the unit stack 26, after which the free end regions of the straps may be draped over the top of the uppermost unit load in such stack. The thus installed anchor device 50 then assumes the position in which it is illustrated in FIG. 2 and the doorway space is then ready for reception of the last unit stack 26 which is loaded thereinto in a progressive manner as will now be described in detail.

It is necessary that in installing the final doorway load or fill sufficient working space be afforded for installation of a second reaction anchor device 50 in the doorway fill for cooperation with the first installed anchor device. This, of course, could be accomplished by assembling the doorway fill outside the confines of the freight car and then inserting the entire fill bodily into the doorway space but the average lift truck is not equipped to perform such a function. Therefore, according to the invention, this final doorway fill is progressively assembled within the doorway space. Accordingly, as shown in FIG. 2, the doorway fill, which consists of two unit stacks 26 extending longitudinally on the platform 30, is assembled by first depositing one such unit stack on the platform of such stack being labelled *a*, *b* and *c* in FIG. 2. Thereafter two unit loads *d* and *e* may be positioned on the platform in front of the unit loads *c* and *b*. With these five unit stacks thus positioned, the second anchor device 50 is applied by inserting the board 52 as indicated in dotted lines and pushing it endwise between the loads *d* and *e* until it extends into the space between the unit loads *b* and *c* as shown in full lines. At this point the free end of one strap 54 may be draped over the load *a* while the free end of the other strap may be draped over the load *e*. The final load *f* may then be applied as shown in FIG. 3 by withdrawing the free end of the second strap 54 and draping it over the load *f* after the latter is in place. The freight car load is then ready for dunnage installation.

The manner in which dunnage installation is effected is illustrated in FIGS. 5, 6 and 7. With the two dunnage anchor devices 50 in place as previously described, the aforementioned plywood sheets 42 are placed within the gap existing between the two adjacent unit stacks 26 and the dunnage bag 32 in its deflated condition is sandwiched between these two sheets, as clearly shown in FIG. 5. Thereafter the dunnage bag 32 is inflated to a predetermined degree of pressure so that it assumes the condition in which it is shown in FIG. 6 with the divided sections of the load being forced hard against the end walls 14 of the cargo compartment.

The final operation of installing the dunnage in the load is accomplished by bringing the free ends of the previously draped straps 54 together in overlapping relationship in the manner shown in FIGS. 4 and 7 and tensioning the same, after which a metallic seal such as is indicated at 60 may be crimped about the overlapping portions of the straps 54. Prior to effecting strap overlap, a strip of cardboard or other protective material 62 may be caused to underlie the straps. The straps 54 thus function as holddown straps to prevent upward movement of the dunnage bag 32.

In the operation of the above described dunnage installation when the freight car is in transit, when a severe impact shock is encountered and there is a consequent tendency for the dunnage bag 32 to shift bodily upwardly as previously described, the overlapping and sealed portions of the straps 54 serve to prevent such upward shifting. As shown in FIG. 7, the straps 54 are under tension and, as a consequence, the reaction anchor boards 52 are caused to bind within the spaces between adjacent superimposed unit loads 20 so that they will not become dislodged.

The particular form of dunnage which is employed for insertion between the divided sections of the load and to which the tie-down arrangement of the present invention is applied constitutes no part of the present invention and various forms of dunnage bags are suitable for use in thus dividing the load. Although a single dunnage bag 32 has been illustrated for loaddividing purposes, it is contemplated that two or more dunnage bags, positioned in either contiguous or spaced apart edge-to-edge relationship between the load divisions may be employed if desired. As an example of a particular dunnage bag which is suitable for use in connection with the present method and installation, reference may be had to U.S. Pat. No. 2,674,206 granted on Apr. 6, 1954 and entitled "Shoring Construction." Irrespective of the particular form of dunnage employed, the essential features of the invention remain the same.

Insofar as the particular means which is employed for sealing the overlapping free ends of the various cooperating straps 54 is concerned, various strapping tools are suitable for such use. One such tool is manufactured and sold by Signode Corporation of Chicago, Illinois under the designation Model No. PNSC-58 and consists of a small portable pneumatic hand tool having facilities for tensioning a strapping loop, applying a metallic seal to the overlapping portions of the loop and, finally crimping the seal.

The invention is not to be limited to the exact arrangement of parts shown in the accompanying drawings or described in this specification as various changes in the details of construction may be resorted to without departing from the spirit of the invention. Neither is the invention to be limited to the precise method steps set forth since installation of the dunnage into the void which exists between the separated load sections and application of the tie-down arrangement thereto may be accomplished by procedures other than those set forth. For example, while the anchor devices 50 are applied to the spaces which exist between the two lowermost pairs of superimposed load units c, d and b, e, it is obvious that these devices 50 may be applied between the two uppermost pairs of load units b, e and a, f. Therefore, only insofar as the invention has particularly been pointed out in the accompanying claims is the same to be limited.

Having thus described my invention, what I claim and desire to secure by Letters Patent is:

1. The method of shoring a plurality of freight items, which consist of vertically stacked unit loads, between the substantially rigid end walls of a shipping compartment and which comprises the steps of: positioning said items in said compartment so as to establish a space between one pair of adjacent items, fastening the ends of respective lengths of strapping to a pair of anchor members, inserting one such anchor member beneath respective unit loads on opposite sides of said space, positioning an inflatable dunnage bag within said space, inflating said bag to expand the same and force the thus divided freight against said end walls while at the same time maintaining said anchor members captured beneath the respective unit loads, causing the free end regions of the lengths of strapping to overlap in bridging relationship with respect to said space directly above the inflated bag, and uniting said overlapping end regions under tension.

2. The method of shoring a plurality of freight items as set forth in claim 1, wherein the step of inserting the ends of the lengths of strapping beneath the unit loads is effected at regions appreciably below the uppermost level of the freight items.

3. The method of shoring a plurality of freight items as set forth in claim 2, wherein the anchor members are inserted between adjacent vertically stacked unit loads.

4. The method of shoring a plurality of freight items as set forth in claim 3, wherein the step of uniting said overlapping end regions of the lengths of strapping under tension consists in shifting said overlapping end regions relative to each other in opposite directions to tension said lengths, and crimping a metallic seal about the same when a predetermined degree of tension has been attained.

5. In a freight shoring installation, in combination, a shipping compartment having a platform deck and substantially rigid spaced apart end walls, a plurality of freight items consisting of vertically stacked unit loads positioned on said deck between said end walls, one pair of adjacent items being spaced from each other and defining a gap therebetween, an anchor member positioned beneath a unit load of each freight item, an expanded inflatable dunnage bag disposed in said gap and serving to force the thus divided freight against said end walls while at the same time maintaining said anchor members captured beneath the respective unit loads, means for securing one end of each strap to one of said anchor members, said straps passing upwardly alongside the adjacent freight items and the other ends of the straps overlapping each other in bridging relationship with respect to said gap and above the expanded dunnage bag, and means for securing said overlapping ends ot the straps together directly above the dunnage bag.

6. In a freight shoring installation, the combination set forth in claim 5, wherein the straps are secured to the opposed side faces of said spaced apart adjacent items below the uppermost level thereof so that the straps extend upwardly alongside the bag on opposite sides of the latter.

7. In a freight shoring installation, the combination set forth in claim 6, wherein the anchor members are interposed between adjacent vertically stacked unit loads.

8. In a freight shoring installation, the combination set forth in claim 7, wherein said unit stacks consist of plural pairs of vertically stacked unit loads, the anchor members, are in the form of lengths of lumber which extend transversely of the platform deck and underlie one pair of unit loads.

* * * * *